US005894016A

United States Patent [19]

Fister

[11] Patent Number: 5,894,016
[45] Date of Patent: Apr. 13, 1999

[54] METHOD OF PREPARING METAL DISULFIDES AND THE FURTHER PROCESSING THEREOF TO FORM DIMETAL TRISULFIDES

[75] Inventor: Dietmar Fister, Murg, Germany

[73] Assignee: H.C. Starck, GmbH & Co. KG, Goslar, Germany

[21] Appl. No.: 08/844,358

[22] Filed: Apr. 18, 1997

[30] Foreign Application Priority Data

May 7, 1996 [DE] Germany .................. 196 18 170

[51] Int. Cl.$^6$ .................. C01B 17/00; C01F 17/32
[52] U.S. Cl. .................. 423/511; 423/561.1; 423/89
[58] Field of Search .................. 423/511, 561.1, 423/89

[56] References Cited

U.S. PATENT DOCUMENTS

| 3,937,794 | 2/1976 | Kanetake et al. | |
| 4,208,394 | 6/1980 | Chianelli | 423/561 R |
| 4,259,310 | 3/1981 | Clapper | 423/561 R |

FOREIGN PATENT DOCUMENTS

| 2333753 | 7/1977 | France | C01G 1/12 |
| 2175292 | 11/1986 | United Kingdom | C01B 17/62 |

OTHER PUBLICATIONS

Gemlin, *Handbuch der Anorganischen Chemie* Bd. Zinn, C 2, Seite 37–40, Springer Verlag 1975.
Abstract No. 115447, Chemical Abstracts, vol. 123, No. 10.
Abstract No. 213266, Chemical Abstracts, vol. 91, No. 26.
Patent Abstracts of Japan, vol. 010, No. 314 (C–380) dated Oct. 24, 1986.

*Primary Examiner*—Gary P. Straub
*Assistant Examiner*—Eileen E. Nave
*Attorney, Agent, or Firm*—Perkins, Smith & Cohen, LLP

[57] ABSTRACT

Method of preparing metal disulfides of the general formula $$(Sn_xMe_{1-x})S_2,$$

wherein

Me represents one or more of the elements Ti, Mo, Fe, Cr, Ta, Nb, Mn, Bi, W and Cu, and x can have values between 0.5 and 1, by mixing Sn, alone or with Me and/or Me sulfides, with a superstoichiometric quantity of S and reacting the same together, in the presence of halide compounds, in an exothermic reaction in an inert atmosphere and the further processing the disulfide product thereof to form dimetal trisulfides.

14 Claims, No Drawings

METHOD OF PREPARING METAL DISULFIDES AND THE FURTHER PROCESSING THEREOF TO FORM DIMETAL TRISULFIDES

BACKGROUND OF THE INVENTION

The present invention relates to a method of preparing metal disulfides of the general formula $(Sn_xMe_{1-x})S_2$, wherein Me represents one or more of the elements Ti, Mo, Fe, Cr, Ta, Nb, Mn, Bi, W and Cu, and x can have values between 0.5 and 1, and the further processing thereof to form dimetal trisulfides.

Metal sulfides such as $SnS_2$ are obtained in small amounts by the reaction of the elements in closed vessels at temperatures of 500° C. (G. Brauer, Handbuch der Präparativen Anorganischen Chemie, 3rd Edition, 1978, 2nd Volume, pages 763 to 765). A $SnS_2$ is also formed by passing hydrogen sulfide into weakly acidic solutions of tin(IV) salts. A tin disulfide, which is also called "mosaic gold", is obtained industrially by heating tin amalgam to red heat with sulfur and $NH_4Cl$ (Ullmann, Encyklopädie der anorganischen Chemie, 3rd Edition, Volume 24, page 672). On account of its golden color, $SnS_2$ is used in particular for gilding objects and in painting. Metal disulfides which contain tin are also suitable for use in tribology (e.g. EP 054 616-A1, U.S. Pat. No. 5,098,758, U.S. Pat. No. 5,433,774).

It is known from Gmelin, Handbuch der Anorganischen Chemie, Band Zinn, C2, pages 37 to 40, published by Springer Verlag, 1975, that $SnS_2$ is obtained by heating amalgamated Sn with excess sulphur and ammonium chloride in open vessels until all the Hg has been expelled (cf. top of page 40). This extract also describes the production of $SnS_2$ from the elements (Sn and S) in closed vessels under very high pressures (cf. bottom of page 39). Both processes are not suitable for industrial production. The resulting products are consequently also described as preparations which on the one hand still contain 0.01 to 0.1% Hg after sublimation or on the other hand are not completely free from SnS and elemental sulphur.

However, sulfides of this type can only be employed for large-scale industrial use in the field of tribological applications if they can be manufactured inexpensively. It is therefore necessary to provide an inexpensive method which enables large amounts to be produced on an industrial scale.

The object of the present invention is therefore to provide a simple, inexpensive method of preparing tin-containing metal disulfides which does not have the disadvantages of the prior art described above.

SUMMARY OF THE INVENTION

It has now been found that with suitable adjustment of the mixture the reaction of tin, sulfur and ammonium chloride results, even under pressureless conditions, in what is substantially stoichiometric $SnS_2$, or in metal sulfide mixtures if other metal components are added.

Accordingly, the present invention relates to a method of preparing metal disulfides of the general formula $(Sn_xMe_{1-x})S_2$, wherein Me denotes one or more the elements Ti, Mo, Fe, Cr, Ta, Nb, Mn, Bi, W and Cu and x can have values between 0.5 and 1, characterised in that a mixture consisting of the metals Sn, Me and/or Me sulfides is reacted together with a superstoichiometric quantity of sulfur, the quantity of the sulfur in the mixture being at least 3 mols, based on x, in the presence of halide compounds which decompose under the reaction conditions without leaving a residue, and/or Sn and/or Me halides, in an exothermic reaction in an inert atmosphere.

A significant advantage of the method according to the invention is that, in addition to the use of pure metal powder, alloy powders and metal sulfides from production residues can also be used; the latter can thus be profitably reused in the sulfide mixtures. These components are advantageously comminuted to particle sizes <150 μm.

DETAILED DESCRIPTION OF PREFERRED EMBODIMENTS

Chlorine compounds, particularly ammonium chloride and/or tin chloride, are preferably used as the halide compounds in the method according to the invention. The method according to the invention proceeds particularly economically when it is conducted so that the amount of halide compounds in the mixture is at least 0.4 mole with respect to x.

Moreover, it is advantageous to use the mixture in compacted form.

One advantageous embodiment of the method according to the invention consists of effecting the reaction by ignition in a batch kiln. The reaction may be effected just as advantageously in a pusher kiln preheated to at least 450° C.; ignition can be dispensed with in the latter case, on account of the self-ignition which occurs under these conditions. The mixture here is preferably held at temperatures of at least 450° C. for 0.5 to 5 hours.

In a mixture with metal sulfides, optionally with the addition of sulfur, the metal disulfides obtained by the method according to the invention can also be converted to the corresponding dimetal trisulfides within 0.5 to 5 hours, under normal pressure and under a protective gas, at temperatures within the range from 600° to 800° C.

The invention is explained below by way of examples, but should not be seen as being restricted thereto.

EXAMPLE 1

1 mole of <63 μm tin powder was dry-mixed with 3.5 mole sulfur powder and 0.5 mole ammonium chloride, and this mixture was consolidated mechanically by compaction. 450 g of the compacted mixture were introduced into graphite boats and were reacted at a temperature of 500°C. in a pusher kiln supplied with nitrogen as a protective gas. After self-ignition, a dwell time of the boat of 2 hours at 500° C. was set, in order to volatilize the excess sulfur, by correspondingly selecting the pusher cycle time.

After cooling the reaction product in the cooling zone of the kiln, the orange-yellow, crystalline material was sieved through a 150 μm sizer and mixed to form larger batches.

The product formed was an almost pure phase of $SnS_2$ with a sulfur content of 35.3% by weight (theoretical: 35.1%), in crystalline form, with small proportions of SnS or $Sn_2S_3$.

EXAMPLE 2

The mixture of raw materials given in Example 1 was introduced loose into the graphite boat and allowed to react completely under flowing nitrogen at 500° C. for 2 hours. The loose sintered block was pre-comminuted in a pinned disc mill and sieved through a 150 μm sizer.

The final product formed (262 g) from the amount of 400 g originally weighed in also, as in Example 1, comprised $SnS_2$ as its major phase, with traces of $Sn_2S_3$ and SnS impurities (sulfur content 34.8%).

EXAMPLE 3

40% by weight Sn, 40% by weight S and 20% by weight $SnCl_2*2H_{2O}$ were dry-mixed and pressed into tablets.

54 g of the tablets were placed in a Thermax boat and inserted in a tube furnace heated to 500° C., and were allowed to react for 0.5 hour ($N_2$ was used as the protective gas). The yellow reaction product (36.4 g) was comminuted in a laboratory pinned disc mill and sieved through a 150 μm sizer.

The product obtained from this reaction contained 34.7% by weight sulfur and 0.4% oxygen. $SnS_2$ was likewise determined by phase analysis as the major constituent, in addition to slight traces of $Sn_2S_3$.

EXAMPLE 4

A mixture of $SnS_2$ and SnS (molar ratio 1:1) to which 10% by weight of sulfur was added, was pressed. This preliminary product was calcined for 2 hours at 700° C. at normal pressure in a graphite boat, under flowing $N_2$ as the protective gas.

The reaction product obtained consisted of 95% of $Sn_2S_3$ in crystalline form; the remainder was $SnS_2$ and SnS.

EXAMPLE 5

192.2 g $MoS_3$, 118.7 g Sn and 32.1 g S were mechanically mixed and pressed into tablets. The tablets were placed in a Thermax boat and inserted into a pusher kiln which was preheated to 700° C. and flushed with nitrogen, and were reacted for three hours. The reaction product (300 g) consisted of a mixture of $MoS_2$+SnS in a molar ratio of 1:1. This material can advantageously be used as a solid lubricant.

EXAMPLE 6

100 g tin powder, 50 g titanium hydride and 150 g sulphur were dry-mixed mechanically, and compacted. Reaction of the pre-pressed reaction mixture was effected at 700° C. under nitrogen in a tube furnace, with a dwell time of one hour.

In contrast to pure $TiS_2$, the reaction product, which was an intimate mixture of $SnS+TiS_2$, was not hygroscopic and could be processed by the usual standard work-up procedures.

EXAMPLE 7

100 g of tin-rich smelting residue, which was comminuted to <150 μm and consisted of 10% by weight Sn, 14% by weight W, 1.4% by weight C, balance Fe, was mixed with 200 g sulfur and 25 g $NH_4Cl$, compacted, and reacted as in Example 1.

The reaction product contained about 32% by weight S. Investigation of the fine structure of the material by X-ray analysis indicated a mixture of $FeS_2$, $SnS_2$, $WS_2$ and $Fe_2SnS_4$. The product, which was comminuted in a mortar and sieved through 150 μm, exhibited various stages of reactivity with increasing temperature when tested thermogravimetrically. These indicated that the sulfides present in the mixture were slowly decomposed with increasing temperature, according to their stability. This is advantageous for many tribological applications.

EXAMPLE 8

100 g of tungsten-rich smelting residue, which was comminuted to <150 μm and contained about 20% by weight W, 5% by weight Sn, 1.5% by weight C, balance Fe, were mixed with 200 g sulfur and 25 g $NH_4Cl$, pressed into tablets, and reacted as in Example 1. The reaction product, which was loosely sintered together, was comminuted to −150 μm and contained about 30% by weight sulfur. It consisted of an intimate mixture of $WS_2$, $SnS_2$, $FeS_2$ and FeS.

I claim:

1. A method of preparing metal disulfides of the general formulae $(SnS_2)$ or $(Sn_xMe_{1-x})S_2$, comprising the steps of:
   (a) providing a solid phase mixture of one or more of Sn, Me and/or Me Sulfides, with a superstoichiometric quantity of solid phase sulfur wherein Me represents one or more of the elements selected from the group consisting of Ti, Mo, Fe, Cr, Ta, Nb, Mn, Bi, W and Cu, and x has a value from 0 to 1,
   (b) reacting the mixture in the presence of one or more halide compounds which decompose under the reaction conditions without leaving a residue, such reaction being conducted as an exothermic reaction and in an inert atmosphere,
   and wherein the sulfur content is provided in a quantity of 3 moles or greater in relation to the Sn content of the mixture.

2. A method according to claim 1, x has values between 0.7 and 1.0.

3. A method according to either of claims 1 or 2, chlorine compounds are used as the halide compounds.

4. A method according to claim 3, wherein the halide compound are selected from the group consisting of ammonium chloride and tin chloride.

5. A method according to claim 4, the quantity of the halide compounds in the mixture is at least 0.4 mol, based on x.

6. A method according to claim 5, the mixture is used in a compacted form.

7. A method according to claim 6, the reaction is carried out by ignition in a batch kiln.

8. A method according to claim 6, the reaction is carried out in a pusher kiln preheated to at least 450° C.

9. A method according to claim 8, the mixture is kept at temperatures of at least 450° C. for 0.5 to 5 hours.

10. A method according to claim 1 wherein x is between 0.7 and 1, the Sn source components are provided as <150 micron powder and the halide compound is present in the reaction in a quantity of at least 0.4 moles based on x and the end product is sized at <150 microns.

11. A method according to any of claims 2, 1, or 10 wherein the quantity of halide compounds is at least 0.4 mole in relation to Sn.

12. A method according to any of claims 2, 1, or 10 wherein the reaction mixture is kept at temperatures of at least 450° C. for 0.5 to 5 hours.

13. A method according to any of claims 2, 1, or 10, wherein the reaction is carried out under pressureless condition.

14. A method according to claim 13, wherein x is from 0.7 to 1.0, the halide compound is selected from the group consisting of ammonium chloride and tin chloride and the reaction is carried out by heating to at least 450° C. for 0.5 to 5 hours.

* * * * *